Oct. 16, 1923.
W. H. GILES
HORSESHOE
Filed May 1, 1923
1,471,119
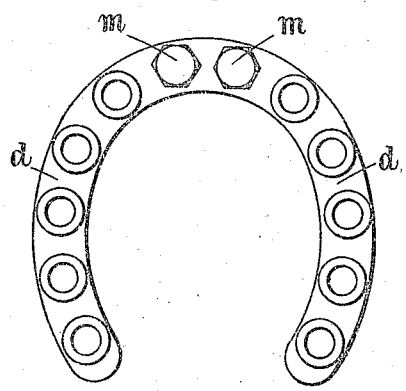
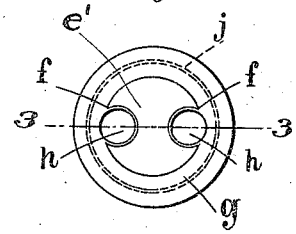
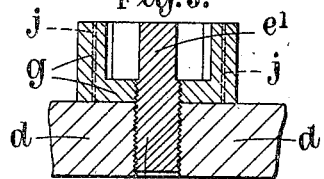
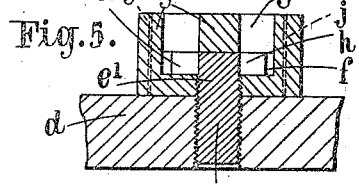
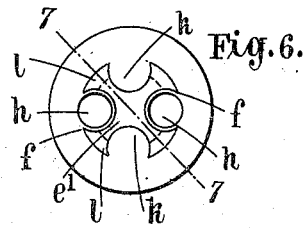
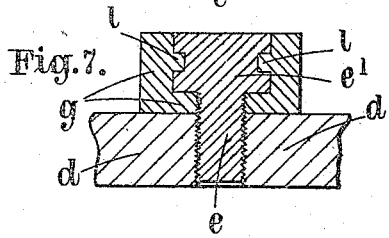
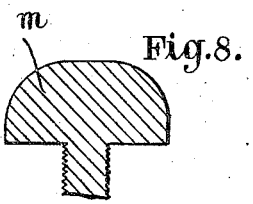
INVENTOR
William Henry Giles
BY Wm Wallace White
ATTORNEY.

Patented Oct. 16, 1923.

1,471,119

UNITED STATES PATENT OFFICE.

WILLIAM HENRY GILES, OF BURTON-UPON-TRENT, ENGLAND.

HORSESHOE.

Application filed May 1, 1923. Serial No. 635,833.

*To all whom it may concern:*

Be it known that I, WILLIAM HENRY GILES, a subject of the King of Great Britain, residing at 2 Rangemore Street, Burton-upon-Trent, in the county of Stafford, England, have invented new and useful Improvements in Horseshoes, of which the following is a specification.

This invention has reference to improvements in or relating to shoes for horses or other animals whereby the ordinary metal shoe is drilled with a number of holes which are threaded and fitted with short screws of iron, steel, or other suitable material, preferably of such a length that the threaded part is slightly less than the thickness of the shoe and the heads of said screws are provided with rubber or other wearing surfaces to come into contact with the roadway or the like, and if desired to form the whole of the road contact surface thereof.

In describing this invention reference will be had to the accompanying sheet of drawings upon which the figures are shown in inverted positions to more clearly illustrate my invention.

Figure 1 is a plan of a horseshoe showing the application of my invention thereto.

Fig. 2 is a plan of a stud to be more particularly hereinafter described,

Fig. 3 is a section on line 3—3 of Fig. 2,

Fig. 4 is a plan of another form of stud to be hereinafter more particularly described, Fig. 5 is a section on line 5—5 of Fig. 4, Fig. 6 is a plan of a further form of stud to be hereinafter more particularly described, Fig. 7 is a section on line 7—7 of Fig. 6, and Fig. 8 is a section of a steel stud to be hereinafter referred to.

Figs. 2, 3, 4, 5, 6, 7 and 8 are drawn to an enlarged scale.

In carrying out my invention I employ a shoe $d$ with a number of screw holes arranged therein between the nail holes to receive the studs as previously herein set forth. Each of said studs other than those at the toe consists in a screw $e$ having a cheese, mushroom, or other suitably shaped head $e'$ with preferably a flattened surface underneath and two grooves $f$ on opposite sides of the head arranged parallel with the axis thereof, so that a forked driver may be employed for fixing or releasing each device to or from said shoe $d$, but any other suitable form of driver or key may be employed and the head constructed to receive the same. In all applications of my invention a space is arranged between the shoe $d$ and the screw head $e^1$ to enable the latter to grip and hold a rubber or other resilient or compressible body $g$ which is arranged to wholly or partially surround and cover said screw head $e^1$ with the exception of two holes $h$ for the admission of the forked driver before referred to.

In the form of stud illustrated in Figs. 2 and 3 the head may be comparatively deep and the outer face finished flush with the surrounding boss of rubber or the like, and in this form I preferably arrange one or more concentric rings, sleeves, or segments $j$ of canvas, metal, or other durable and strengthening insertion. In this form it will be understood that the head of the screw and the surrounding rubber or the like wear away together. The rubber cushion or boss $g$ in this form of the invention is hollow, cylindrical or substantially cup-shaped, being composed of vertical cylindrical walls and the flat horizontal bottom having a central opening for the passage of the screw $e$. In the form of the invention hereinafter described, in which the cushion or compressible body covers the outer face of the head $e^1$ of the screw, the cushion or body is provided in its outer wall or portion with openings $g'$ arranged in alinement with the grooves or openings $h$ in the head of the screw.

In the form of stud illustrated on Figs. 4 and 5 the head $e^1$ of the screw may be shallow in depth and have a very considerable thickness of rubber covering over it.

In the form of stud illustrated on Figs. 6 and 7 additional slots $k$ are employed of suitable section, in the sides of the screw head $e^1$, say for example two, said additional slots being for the purpose of allowing the rubber or the like to run in and help to hold it in position.

I may in any or all cases employ other devices such as a peripheral or annular groove or grooves $l$ of suitable shape or cross section in the outer face of the head of the screw (see Figs. 6 and 7) to insure as firm and unbreakable a connection between the different substances as possible.

I preferably employ at the toe of the shoe, say at $m$, $m$, or in any other desired position, steel or other metal studs of suitable section such as that of the domed hexagon shown on Fig. 8.

The sum of the rubber or other coverings of the screw heads or of the studs is sufficient, if desired, to nearly cover the whole of the ground surface of the shoe and of sufficient thickness to prevent concussion and also to provide a maximum amount of wear and security of foothold upon slippery roads.

The iron shoe may be fitted hot and then when cold can be nailed on in the ordinary way, the only difference being that the farrier having hammered the nail heads well into the nail holes of the shoe removes with his rasp any portions of the nail heads which project from the ground surface of the shoe; and he thus produces a perfectly flat ground surface to the iron shoe. This is necessary to allow a perfect fitting of the screws, and as the heads of the nails do not come in contact with the ground the shoe is less likely to become loose. The studs are now inserted with a driver or spanner or key or other tool and the foot is ready for the road.

As the shoe when kept properly studded does not wear out, a light metal shoe only is required, and in horses who wear shoes out quickly the harm done by constantly nailing on new shoes is eliminated; further, with these shoes a horse can take a heavier load uphill than with ordinary shoes owing to the better foothold obtained.

I am aware that it has previously been proposed in shoes for horses and other animals to employ screwed-in metal calks with channels or slots for insertion of a tool to facilitate removal, and that such studs have been variously formed to hold or contain rubber, leather, or the like to prevent noise and concussion, and I lay no broad claim to the exclusive use of such devices.

What I claim is:

1. In a shoe for horses and other animals, a threaded stud adapted to be screwed into a shoe and provided with a head spaced from the shoe and having opposite openings disposed in substantial parallelism with the axis of the stud, and a hollow resilient cushion fitted on the head and clamped between the same and the shoe.

2. In a shoe for horses and other animals, a threaded stud adapted to be screwed into a shoe and provided with a head having spaced openings arranged in substantial parallelism with the axis of the stud, a substantially cup-shaped cushion fitted on the head of the stud and clamped between the same and the shoe, and a sleeve of reinforcing material incorporated in the cushion and arranged concentric with the stud.

3. In a shoe for horses and other animals, a threaded stud adapted to be screwed into a shoe and provided with a head spaced from the shoe and having axially disposed openings, a hollow cushion fitted on the head of the stud and clamped between the same and the shoe and provided with axially disposed openings arranged in alinement with the openings of the head.

In testimony whereof I have signed my name to this specification.

WILLIAM HENRY GILES.